United States Patent
Espinal et al.

(10) Patent No.: US 11,710,894 B1
(45) Date of Patent: Jul. 25, 2023

(54) VEHICLE-MOUNTED SENSOR AND ANTENNA ASSEMBLY

(71) Applicant: Zoox, Inc., Foster City, CA (US)

(72) Inventors: Miguel Alexander Espinal, South San Francisco, CA (US); Daniel Glenn Johnson, San Francisco, CA (US); Robert Nicholas Moor, San Mateo, CA (US); George Dalman Nelson, III, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 304 days.

(21) Appl. No.: 17/039,461

(22) Filed: Sep. 30, 2020

(51) Int. Cl.
| | |
|---|---|
| *H01Q 1/32* | (2006.01) |
| *H01Q 1/42* | (2006.01) |
| *B60R 11/04* | (2006.01) |
| *H04N 23/51* | (2023.01) |
| *H04N 23/56* | (2023.01) |
| *B60R 11/00* | (2006.01) |

(52) U.S. Cl.
CPC .......... *H01Q 1/3275* (2013.01); *B60R 11/04* (2013.01); *H01Q 1/42* (2013.01); *H04N 23/51* (2023.01); *H04N 23/56* (2023.01); *B60R 2011/004* (2013.01); *B60R 2011/005* (2013.01)

(58) Field of Classification Search
CPC ........ H01Q 1/3275; H01Q 1/42; B60R 11/04; B60R 2011/004; B60R 2011/005; H04N 5/2252; H04N 5/2256
See application file for complete search history.

(56) References Cited

U.S. PATENT DOCUMENTS

| | | | |
|---|---|---|---|
| 2019/0056223 A1* | 2/2019 | Ishihara | .................... G06T 7/70 |
| 2021/0092261 A1* | 3/2021 | Miller | .................... G03B 13/36 |
| 2021/0132475 A1* | 5/2021 | Sickler | .................. B60R 16/023 |
| 2022/0089129 A1* | 3/2022 | Krishnan | ................ B60R 11/04 |

* cited by examiner

*Primary Examiner* — Nasim N Nirjhar
(74) *Attorney, Agent, or Firm* — Lee & Hayes, P.C.

(57) ABSTRACT

A vehicle mounted sensor assembly includes a frame and a cover connected to the base. When assembled, the frame and the cover define a volume that is divided between a first cavity and a second cavity. A sensor is disposed in the first cavity and one or more antennas are disposed in the second cavity.

19 Claims, 5 Drawing Sheets

VEHICLE-MOUNTED SENSOR AND ANTENNA ASSEMBLY

BACKGROUND

Many vehicles in operation today are designed to perceive their surroundings using sensors. The sensors are often integrated into the vehicle, for example, in vehicle body panels. Integration into the vehicle body, however, often limits the field of view of the sensors. In other examples, sensors may be mounted to an exterior of a vehicle, such as on a roof of the vehicle. However, placement of the sensors on the exterior of the vehicle increases a likelihood of the sensor impacting an external object potentially causing damage to the sensor and/or the object impacted. These and other issues are complicated by the number and type of sensors to be included on the vehicle. While sensor technology is improving, compact, electric, bidirectional, and/or autonomous vehicles have unique components and configurations that, under certain conditions, conventional sensor systems may be insufficient to provide data to the vehicle during operation or may cause long delays while the sensors are replaced.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

As discussed above, integrating components into a vehicle, such as an autonomous vehicle, is critical. Without limitation, components to provide adequate sensor coverage and/or to promote communication of the vehicle with other devices, while maintaining a desired vehicle profile, are important. Moreover, sensors and antennas used in vehicles are expensive and should be maintained in a way that prevents destruction from the elements, deters theft, and/or otherwise maintains the components secure and safe. Conventionally arrangement of sensors and antennas may result in time consuming replacement and/or maintenance. For example, for a sensor that is embedded within a vehicle body, e.g., in a body panel, the process to remove and replace the sensor often requires the removal of the body panel and/or other portions of the vehicle. This can be a relatively long and involved process preventing the vehicle to be in service.

This application relates to structures and techniques for improving sensor and antenna placement, packaging, maintenance, and replacement, while providing protection to the sensor(s) and antenna(s). In examples, the antenna(s) and sensor(s) may be disposed in self-contained assemblies that are removably coupled to the vehicle, e.g., on the roof of the vehicle. Multiple sensor assemblies, for example two, may be disposed on the roof of the vehicle to provide sensor coverage for an environment surrounding the vehicle and/or for providing wireless data reception.

In examples of this disclosure, a sensor assembly includes a frame and a cover securable to the frame. For example, the frame may include a base, e.g., a generally planar base, and a wall extending, e.g., generally upward, from the base. The frame may be a rigid structure and may define a plurality of mounting surfaces. For instance, the base may include a first mounting surface and the wall may include a second mounting surface. The frame may also include one or more mounting features, to promote securement of the frame to a roof of a vehicle.

A cover is secured to the frame. The cover and the frame define a volume that is partitioned by the wall. For example, in some implementations, a portion of the cover proximate a first end of the sensor assembly, a portion of the base proximate the first end of the sensor assembly and a first side of the wall define a first cavity. Moreover, a portion of the cover proximate a second, opposite end of the sensor assembly, a portion of the base proximate the second end, and a second side of the wall define a second cavity. In some examples, the wall contacts an inner surface of the cover, e.g., to effectively seal the first cavity relative to the second cavity.

In some examples, a sensor is disposed in the first cavity. For example, the sensor may be mounted to the wall of the frame and may be positioned to capture sensor data of an environment of the vehicle. To facilitate this sensing, an opening or cutout is provided in the first end of the cover. In examples, the opening may include a substantially continuous edge that is sized to approximate a field of view of the sensor. The edge may include an undercut and may reduce or prevent stray light entering through the opening in the cover from reaching the sensor.

In some implementations, a sensor assembly can also include a lens assembly disposed in the first cavity with the sensor. For instance, the lens assembly can include a protective lens that covers the sensor. Moreover, the lens assembly can include a cleaning system configured to remove debris, moisture, or the like from the lens. In at least some examples, the cleaning system can include one or more of compressed air, fluids, a vibration actuator, a wiper mechanism, a heating element, or the like, to remove the debris. Also in examples, the lens system can include a mask or other feature that, like the sensor opening in the cover discussed above, may be configured to reduce, or eliminate stray light entering the sensor. In at least one example, the mask may be formed on the lens to circumscribe an array corresponding to the field of view of the sensor, e.g., such that light hitting the lens outside the field of view will not pass through to the sensor.

In at least some examples, the cover includes two or more pieces that are securable to each other. For instance, the cover can include a main body and a cap. In some examples, the lens assembly may be fixed to the main body, e.g., on an exposed face of the main body when the cap is removed, and the cap may be secured to the main body to cover the lens assembly. The sensor opening in the cover may be formed in the cap. The two-piece structure of the cover, e.g., including the main body and the cap, may divide the first cavity into two portions, e.g., a first that is exposed to the elements via the sensor opening, and a second, containing the sensor, that is sealed from the elements. In other examples, the cover may be a single unit.

In some implementations, an antenna assembly is disposed in the second cavity. For example, the antenna assembly can include a plurality of different antennas that facilitate communication with the vehicle including the sensor assembly. In at least some examples, the antennas can include Wi-Fi, cellular, Near-Field, Bluetooth, or any other radio antennas. One or more light emitters may also be disposed in the second cavity. For example, the light emitters may be disposed to emit light through an opening formed in the top of the cover.

In some examples, the sensor assembly, e.g., by providing the first and second cavities, can separate the sensor from the antennae and/or the light emitters to minimize interference between these different components. In some instances, shielding may be provided to reduce electrical interference. Also in examples, frequencies associated with the sensor and/or the antennae can be adjusted to further minimize interference.

In examples, the frame and cover may be cast, molded, or otherwise formed to provide accurate positioning relative to each other. In such examples, the frame provides a rigid mount for the sensor and antennas and may maintain spacing therebetween that minimizes interference. Moreover, accurate positioning of the cover relative to the frame may, in some examples, reduce the computational resources required for calibration (e.g., by ensuring that the sensor is placed within some known tolerance relative to the sensor opening in the cover) as well as by reducing the number of required calibrations by ensuring little to no movement when operating the vehicle.

In some examples, the sensor assembly is mounted to the roof of the vehicle. In at least some instances, the sensor assembly is mounted in a recess formed in the roof and a fascia is configured for placement over a portion of the sensor assembly. For instance, the frame may be mounted to one or more surfaces in the recess, and the fascia may cover the recess as well as the mounting components. In at least some instances the fascia may be complementary to the roof, e.g., to form a substantially continuous and smooth roof line. The fascia may include one or more seals to prevent debris, moisture, or the like, from entering the recess.

In examples, when the sensor assembly is mounted to the vehicle, one or more wires, cables, conduits, or the like may pass from components in the sensor assembly, e.g., the sensor, the antennae, the lens assembly, or the like to component in the vehicle. Such connections may provide power to the sensor, the antennae, the lens assembly, the light emitters, and/or the like. The connections may also provide pressurized fluid to the lens assembly, e.g., for cleaning the lens associated with the sensor. In examples, the connections may also electrically couple the vehicle and the components in the sensor assembly to transmit data, e.g., sensor data from the sensor to a computing system of the vehicle or instructions from a computing system of the vehicle to one or more of the components.

In some instances, the vehicle may have multiple sensor assemblies disposed on the roof of the vehicle. For example, the vehicle may include a body having a first end and a second end distal to the first end along a longitudinal axis.

A first sensor assembly may be disposed proximate the first end, e.g., along the longitudinal axis, and a second sensor assembly may be disposed proximate the second end. In this example, the sensor in the first sensor assembly may have a first effective sensor field of view for sensing objects in front of the vehicle when the first end of the body is a leading end of the vehicle. The second sensor assembly may have a second effective sensor field of view for sensing objects in front of the vehicle when the second end of the body is the leading end of the vehicle. While certain examples are provided in the context of a vehicle having sensor and antenna assemblies disposed proximate two ends of the vehicle and on the roof of the vehicle, in other examples other numbers and configurations of sensor and antenna assemblies may be used and/or the assemblies may be disposed at other locations (e.g., elevations, lateral spacing, and/or longitudinal spacing) relative to the vehicle. Additionally, while example sensor and antenna assemblies provided herein include particular combinations of sensors, antennae, cleaning systems, and/or light emitters, in other examples, sensor assemblies incorporate more or fewer components. In other examples, sensor assemblies may include additional sensors, e.g., to provide a desired resolution or redundancy.

Figure 1:
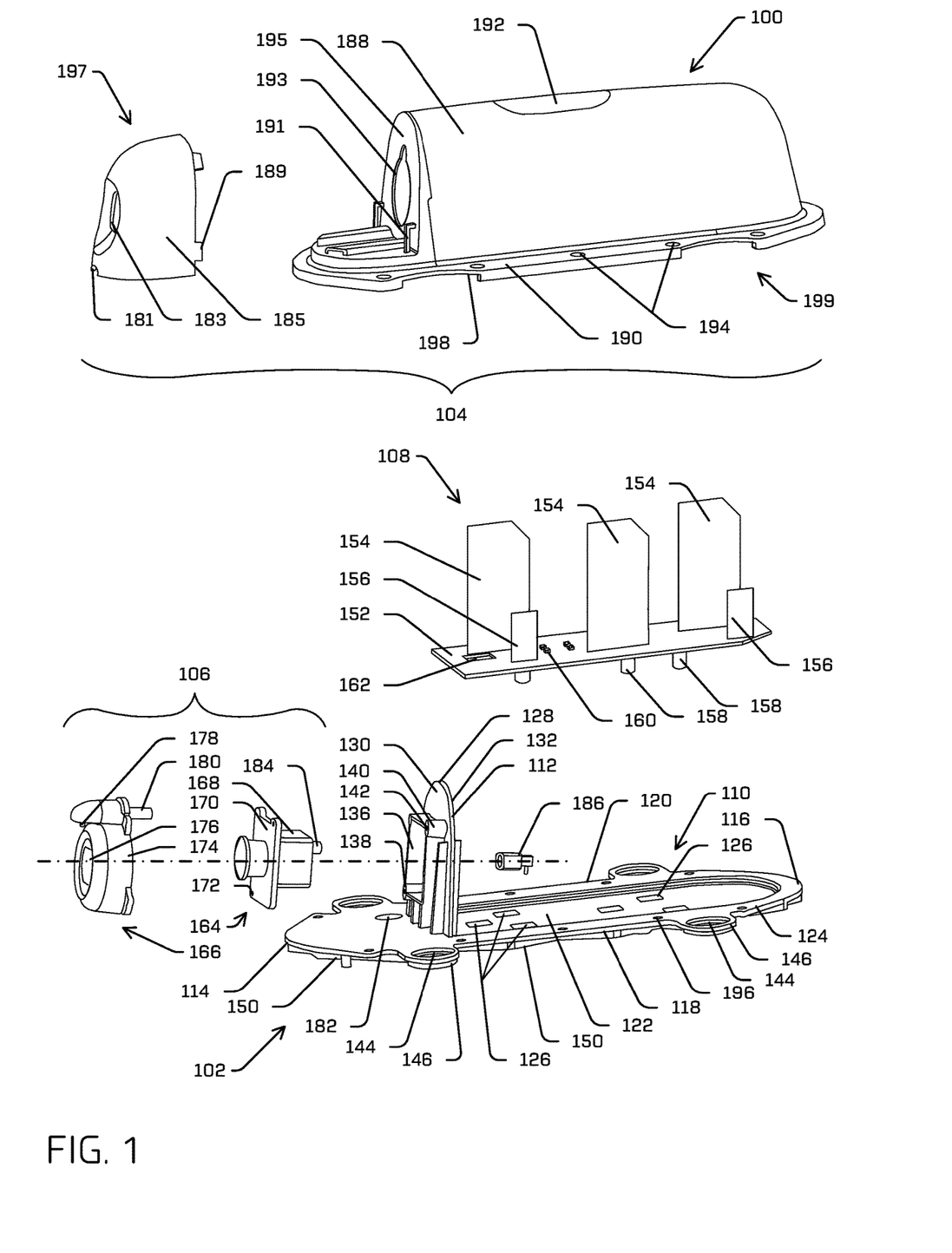
FIG. 1 is an exploded perspective view of a sensor and antenna assembly, in accordance with examples of this disclosure.

FIG. 1 is an exploded perspective view of a sensor assembly 100. As illustrated, the sensor assembly 100 generally includes a frame 102 and a cover 104 securable to the frame 102. As detailed further herein, the frame 102 and the cover 104 cooperate to form an enclosed space that includes two cavities. In the example of FIG. 1, a sensing device 106 is configured for placement in one of the cavities, and an antenna assembly 108 is configured for placement in the other of the cavities. Aspects of each of these components, as well as additional components, are described herein.

The frame 102 generally includes a base 110 and a wall 112 depending upwardly from the base 110. In examples, the base 110 extends longitudinally from a first end 114 to a second end 116 and laterally between a first side 118 and a second side 120. In the illustrated example, the base 110 is generally elongate, e.g., longer in the longitudinal direction than in the lateral direction. The base 102 generally provides a mounting surface 122. In the illustrated example, the mounting surface 122 is recessed relative to a periphery 124 of the base 110. In other examples, the mounting surface 122 may be coplanar with the periphery 124 and/or raised relative to the periphery 124. As detailed further herein, the mounting surface 122 is provided for mounting the antenna assembly 108. A number of openings 126 (six in the example of FIG. 1) are formed through the mounting surface 122. Although six of the openings 126 are illustrated in FIG. 1, other examples may include more or fewer of the openings 126. The openings 126 generally are provided as a passageway through which a harness, conduits, wires, or the like may pass from the sensor assembly 100 to a position inside a vehicle, as detailed further herein. Without limitation, power may be supplied to the antenna assembly 108 via the openings 126.

The wall 112 generally extends upwardly from the base 102, terminating at a top 128. In the illustrated embodiment, the top 128 is arcuate. As detailed further herein, a shape of the wall 112, including the shape of the top 128, may be configured to cooperate with an interior surface of the cover 104, e.g., to contact the interior surface of the cover 104. The wall 112 has a first side 130 generally facing the front 114 of the base 110 and an opposite, second side 132 (obscured in the view of FIG. 1), generally facing the second end 116 of the base 110. In examples, the wall 112 may be generally perpendicular to the base 110, or the wall 112 may be angled other than 90°. In examples, the wall 112 may be angled from about 45° to about 135° relative to the base 110. As will be appreciated from the disclosure herein, the angle of the wall 112 relative to the base 110 may determine an orientation of a component, such as the sensing device 106, mounted on the wall 112.

As also shown in FIG. 1, a substantially rectangular mounting structure 134 extends from the first side 130 of the wall 112. The mounting structure 134 provides a mounting surface 138 on which the sensor device 106 is mounted, as detailed further below. In the illustrated example, the mounting structure 134 generally includes four sides with posts 140 at two of the corners formed by the sides. Mounting holes 142 are provided in the posts and are configured to receive fasteners, such as threaded fasteners, to secure the sensor device 106 to the mounting surface 138. As will be appreciated, the mounting structure 136 is only an example. In other implementations, the mounting structure 136 may be differently sized, shaped, or oriented. For instance, the mounting structure 136 may be configured based on a mounting structure associated with the sensing device to be mounted thereon. Also, although in the example illustrated in FIG. 1, the mounting surface 136 is spaced from the first side 130 of the wall 112, in other embodiments, the first side 130 may be the mounting surface 138. Stated differently, some implementations of this disclosure may not require the mounting structure 136. Moreover, although the example of FIG. 1 illustrates the mounting structure 136, and thus the mounting surface 138, as being disposed on the first side 130 of the wall 112, in other examples the mounting surface 138 may be formed on the second side 132 of the wall 112 and/or on the base 110. In examples described herein, when the sensor assembly 100 is assembled, the sensor device 108 is disposed in a cavity formed at least in part by the first side 130 of the wall 112, e.g., proximate the first end 114 of the base 110. Mounting configurations other than that shown in FIG. 1 may be used to achieve this positioning of the sensor device 108.

The frame 102 promotes secure attachment of the sensor assembly 100 to a vehicle. For instance, the frame 102 includes a plurality of mounting holes 144, for receiving fasteners to facilitate attachment to a roof of a vehicle. In the illustrated example, the mounting holes 144 extend through feet or tabs 146 extending laterally from the base 110. Four of the tabs 146, each having one of the mounting holes 144 are shown in the example of FIG. 1, two extending laterally from the first side 118 of the base 110 and two extending laterally from the second side 120 of the base 110. In sine examples, the mounting holes 144 may include a bore or have an otherwise stepped profile, such that when a mounting fastener is passed through one of the respective mounting holes 144, e.g., for threaded engagement with a threaded hole in the vehicle, a head of the fastener contacts the bore. In other examples, more or fewer of the mounting holes 144 may be provided. Moreover, one or more of the mounting holes 144 may be formed other than in the tabs 146. Without limitation, in some embodiments the frame 102 may be secured to the vehicle via mounting holes formed through the base 110. Also in examples, the frame 102 may be secured other than with fasteners passed through the mounting holes 144. Without limitation, the mounting holes 144 may not be provided in some embodiments, and, instead, clips, detent mechanisms, or other mechanical fasteners may be used to secure the frame 102 to the vehicle.

In addition to securing the sensor assembly 100 to the vehicle, the frame 102 also provides stability for components of the sensor assembly 100. For instance, and as detailed further herein, the frame 102 provides a mounting structure for the sensor device 106, which may be used to sense objects in an environment of the vehicle. For instance, the sensor device 106 may be used to detect objects relative to which the vehicle is to travel in an environment, e.g., without contacting the objects. Because information provided by the sensor device 106 may be critical to proper functioning of the vehicle including the sensor assembly 100, the frame 110 must be sufficiently rigid to prevent excessive movement of the sensor device 106 relative to the vehicle. In some examples, the frame 102 may include a number of ribs 148 supporting the wall 112 relative to the base 110. Moreover, stiffening supports 150 along a bottom of the base 102 may provide additional rigidity. In examples, the frame 102 may be a cast or molded structure and the ribs 148 and/or stiffening supports 150 may be formed using those conventional processes. Additional or different stiffening structures may also be used. In at least some examples, the frame 102 may be formed of a polymer or polymer infused with stiffeners, such as glass or other rigidity-enhancing materials. In other examples, the frame 102 may be formed from carbon fiber or other materials. Moreover, and although not illustrated in FIG. 1, the base 110 may include one or more inserts over which the portions of the frame 102 visible in FIG. 1 are over-molded. Without limitation, circular metal inserts, formed as rings, may be provided around the mounting holes 144 to provide extra rigidity at these attachment points. Alternatively, or in addition, metal plates or the like may be provided in portions of the base 110 and/or the wall 112. Other methods of stiffening the frame 102 may also be appreciated by those having ordinary skill in the art, with the benefit of this disclosure. In some examples, the frame 102 may have stiffness that results in equal to or less than about 0.1° of displacement in any of the roll, pitch, or yaw direction, when the vehicle and/or the senor assembly 100 is/are subjected to vibrations of about 60 Hz or higher.

As described above, the base 102 provides a first mounting surface, e.g., the mounting surface 122, to which the antenna assembly 108 is mounted, and a second mounting surface, e.g., the mounting surface 138, to which the sensor assembly 106 is disposed. As shown, when the sensor device 106 is secured to the mounting surface 138 and the antenna assembly 108 is secured to the mounting surface 122, the wall 112 is generally disposed between the sensor device 106 and the antenna assembly 108, e.g., in a longitudinal direction of the frame 102. As detailed further herein, the wall 112 acts as a barrier between the sensor device 106 and the antenna assembly 108, e.g., to prevent interference therebetween. In some instances, the wall 112 may be formed of or otherwise include a shielding material to reduce interference.

The antenna assembly 108 generally includes a board 152, which may be a circuit board, such as a printed circuit board, or the like. A plurality of first antennas 154 (three of which are illustrated) and a plurality of second antennas 156 (two of which are illustrated) extend upwardly from the board 152. In examples, the first antennas 154 may include cellular antennas, to facilitate cellular communication, e.g., 3G, 4G, LTE, 5G communication, via a cellular radio, and the second antennas 156 may include Wi-Fi antennas. In other examples, the first antennas 154 and/or the second antennas 156 may include other or additional antennas. Although three of the first antennas 154 and two of the second antennas 156 are shown in FIG. 1, more or fewer of each antennas may be used. Without limitation, as cellular radios may require two antennas, an even number of the first antennas 154 may be provided in some examples. Moreover, and as will be described further herein, when two instances of the sensor assembly 100 are used on a single vehicle, one cellular antenna from each of the instances may be associated with a single cellular radio.

The antenna assembly 108 also is illustrated as including a number of connectors 158 generally depending from a bottom of the board 152. In examples, the connectors 158 may be any style of connector configured for coupling with a cable or other electrical component. For instance, the connectors 148 me be connected to a power supply and/or may provide data communication functionality. FIG. 1 illustrates three of the connectors 158, although more or fewer may be used. In some examples, one data connector may be associated with each of the antennae, although such is not required. When the antenna assembly 108 is secured to the mounting surface 122, the connectors 158 may pass through the base 110 via the openings 126.

Antenna assembly 108 also includes a plurality of light emitters 160. In the illustrated example, the light emitters 160 are secured to a top surface of the board 152. Without limitation, the light emitters may be light emitting diodes (LEDs) integrated into the board 152. The light emitters 160 may be configured to emit light in a direction normal to the board 152, e.g., up in the orientation of FIG. 1. In some examples, the light emitters 160 may be configured to emit different color light. For instance, a subset of the light emitters 160 may be configured to emit white light, and another subset of the light emitters 160 may be configured to emit red light. As detailed further herein, the light emitters 160 may emit light through a lens or opening in the cover 104. This emitted light may be visible from a position above the vehicle, e.g., to helicopters, drones, aircraft, or otherwise.

FIG. 1 also illustrates an opening 162 formed through the board 152. The opening 162 is an example, as more openings and/or openings of different sizes, shapes, or the like may be provided through the board 152. In the illustrated example, the opening 162 may align with one of the openings 126 formed through the mounting surface 122. A cable, conduit, or the like may pass through the opening 162 and the aligned one of the openings 126 in some examples, e.g., to provide power to and/or to transfer data to/from aspects of the sensor device 106.

The sensor device 106 generally includes a sensor 164 and a lens assembly 166 cooperating with the sensor 164. In some examples, the sensor 164 is a narrow-angle camera, although the sensor 164 may be other than a camera in some examples. For instance, and without limitation, the sensor 164 may be a lidar sensor, a radar sensor, a time of flight sensor, a wide-angle camera, a fish-eye camera, a thermal imaging camera, or other sensor. Generally, the sensor 164 includes a sensor body 168 and a sensor mount 170. The sensor body 168 includes the electromechanical components of the sensor 164. The sensor mount 170 includes a plurality of mounting holes 172, which are aligned with the mounting holes 142 on the mounting structure 136.

The lens assembly 166 is generally configured for placement over the sensor 164, e.g., to prevent dust, debris, and the like, from impacting operation of the sensor 164. The lens assembly 166 includes a housing 174 holding a lens 176. When secured to the sensor 164, the lens 176 is generally aligned with a lens of the sensor 164. The lens assembly can also include functionality to clean the lens 176, e.g., as a cleaning system. As shown in FIG. 1, the lens assembly 166 includes a nozzle 178 fixed relative to the lens 176 to direct fluid on to the lens 176, e.g., to remove debris from the lens 176. Although not illustrated in FIG. 1, the lens assembly 166 may include a vibrator, motor, or other electromechanical device to vibrate or otherwise move the housing 174 and/or the lens 176, e.g., relative to the sensor 164, to remove fluid sprayed by the nozzle 178 and/or debris from the lens assembly 166. In examples, fluid may be provided via a conduit 180. Only a section of the conduit 180 is illustrated. In examples, the conduit 180 may pass through the frame 102, e.g., via an opening 182 through the base 110, and to a fluid supply in the vehicle. In other examples, the fluid may be stored in the sensor assembly 100, e.g., in a reservoir, bladder, or the like. The cleaning system may also include other or additional components, such as a heating element, a wiper element, or the like to remove ice, debris, moisture, or the like that may contact the lens 176. The sensor device 106 may be similar to or incorporate features of sensor systems disclosed in U.S. patent application Ser. No. 16/011,335, titled "Sensor Obstruction Detection and Mitigation Using Vibration and/or Heat," the entirety of which is hereby incorporated by reference.

As also illustrated in FIG. 1, when the sensor 164 is secured to the frame 102, e.g., via threaded inserts passed through the mounting holes 172 and threadably engaged with the mounting holes 142 on the mounting structure 136, a connection 184, e.g., for data, power, and/or the like, may be exposed via an opening (not shown) through the wall 112. A connector 186 disposed proximate the second side 132 of the wall 112, is secured to the connection 184. In the illustrated example, the connector 186 includes one or more wires, e.g., in a conduit, that pass through one of the openings 126 to connect to a power source in the vehicle.

The cover 104 generally includes a domed top 188 and a flanged periphery 190. The domed top 188 includes an opening 192 through which light emitted from the light emitters 160 passes through the cover 104. Although not illustrated in FIG. 1, a lens may be secured in the opening 192 to inhibit debris from entering the cavity defined by the domed top 188. The lens may also affect light passing therethrough, such as by redirecting of diffusing light emitted from the light emitters 160. Although not visible in FIG. 1, a shape of an inner surface of the domed top 188 may cooperate with a contour of the wall 112, e.g., the top 128 of the wall 112, to effectively seal the cover 104 relative to the wall 112 of the frame 102. For instance, the inner surface of the dome top 188 may contact the periphery of the wall 112 to prevent light emitted by the light emitters 160 from passing between the inner surface of the domed top 188 and the wall 112. In at least some examples, a seal may be provided between the periphery of the wall 112 and the inner surface of the domed top 188 to further prevent light from passing.

The flanged periphery 190 includes a plurality of holes 194 that, when the cover 104 is placed on the base 102, align with corresponding holes 196 spaced about the periphery of the base 110. In some examples, the corresponding holes 196 in the base 110 are threaded to receive threaded fasteners passed through the holes 194 in the cover 104. In other embodiments, fasteners other than threaded fasteners may be used to secure the cover 104 to the frame 102. In the illustrated example, the cover 104 also includes notches 198 in the periphery 192. When the cover 104 is secured to the frame 102, the tabs 146 protrude laterally from the cover 104 via the notches 198. Thus, the cover 104 may be secured to the frame 102, e.g., via the holes 194 in the periphery 192 of the cover 104 and the corresponding holes 196 in the base 110 to assemble the sensor assembly 100, and the assembled sensor assembly 100 may then be secured to the vehicle roof via the mounting holes 144 in the tabs 146 extending through the notches 198.

The cover 104 may be formed as two pieces, as in the example of FIG. 1. More specifically, the cover 104 may include a main body 199 and a cap 197 configured for securement to the main body 199. In the illustrated example, the main body 199 has an exposed face 195 and an opening 193 through the exposed face 195. In examples of this disclosure, the lens assembly 166 may be secured to the exposed face 195 and the sensor 164 may be disposed at least partially in the opening 193 and/or to sense objects through the opening 193. The main body 199 and the cap 197 may also have cooperating datum features and/or fastening mechanisms to align and/or secure the cap 197 relative to the main body 199. In the example of FIG. 1, the main body 199 includes one or more posts 191 engageable by tabs 189 on the cap 197. For instance, the tabs 189 may have an undercut or similar feature to engage with the post, e.g., via a snap fit. The cap 197 is preferably securable to the cover 199 without the need for additional tools or separate fasteners, but is secure enough to resist removal, e.g., from vibration and/or air resistance resulting from operation of the vehicle and/or from nefarious actors. The posts 191 and tabs 189 arrangement is only for example. As also shown in FIG. 1, one or more channels 187 may be provided on the main body 199 and configured to receive protrusions or rails (not shown) on the cap 197. For instance, the channel(s) 187 may slidably receive the unillustrated protrusion and act as guides to assist in proper alignment of the cap 197 relative to the main body 199 during assembly.

The cap 197 includes a generally continuous, contoured cap body 185. The contour of the cap body 185 generally compliments that of the main body 199 such that when assembled, the cover 104 has a generally continuous outer surface. The surface may be generally smooth and an overall shape of the cover 104 may be aerodynamically designed to reduce an impact of the sensor assembly 100 on travel of the vehicle. As also illustrated in FIG. 1, the cap 197 includes a sensor opening 183. The sensor opening 183 may act as a viewing window through which the sensor 164 can sense objects. In some instances, and as detailed further below, a periphery of the opening 183 is shaped to approximate a theoretical field of view of the sensor 164, e.g., theoretical at the cap 187. For example, the sensor opening 183 may be sized such that only light rays travelling within the field of view of the camera enter the cap 187 via the opening 183 and thus are imaged by the sensor 164. The cap 197 also includes a drain opening 181. The drain opening 181 provides a location of egress for fluids, debris, rain, or the like that may enter the cap 197 via the sensor opening 183 and/or via the nozzle 178 of the lens assembly 166. Although only the drain opening 181 is illustrated as a single, centrally-located opening, the drain opening 181 can include more openings and/or may be disposed other than centrally. Although FIG. 1 shows the cover 104 as two components, in other examples the cover 104 may be a single component.

In some examples, the frame 102 may be provided, e.g., as a unitary piece. The antenna assembly 108 may be secured to the mounting surface 122 and the sensor 164 may be secured to the mounting surface 138. The main body 199 of the cover 104 may then be secured to the frame 102, e.g., via the holes 194 in the flanged periphery 190 of the main body 199 and the corresponding holes 196 in the base 110. In examples, the lens assembly 166 may be secured to the exposed face 195, e.g., over the sensor opening 193. The lens assembly 166 may be coupled to the main body 199 before or after securing the main body 199 to the frame 102. The cap 197 may then be secured to the main body 199 to complete assembly of the sensor assembly 100. The sensor assembly 100 may then be secured to a vehicle, e.g., on the roof of the vehicle, and appropriate connections, e.g., data, power, fluid, or the like, may be made between the sensor assembly 100 and the vehicle.

Figure 2:
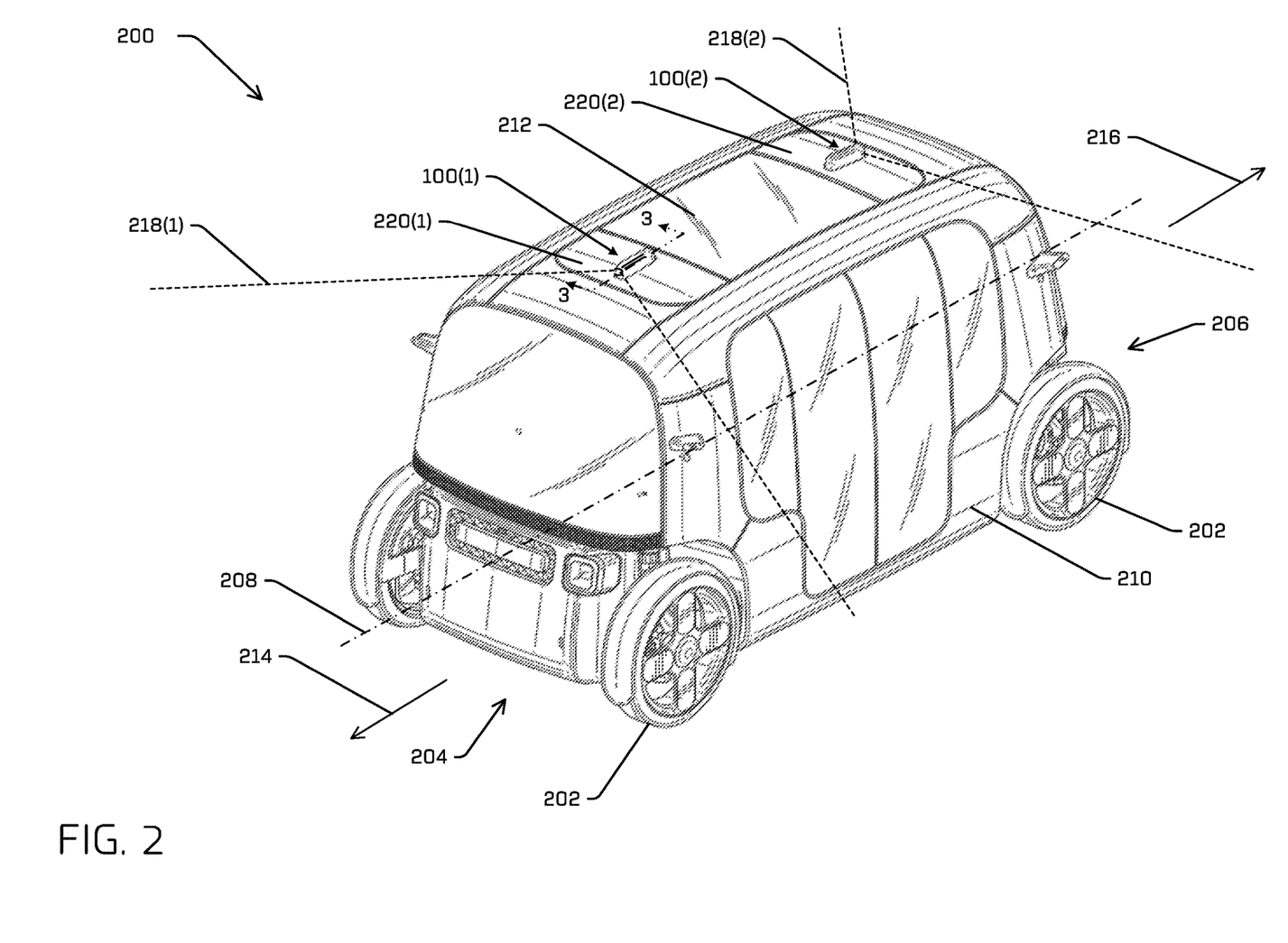
FIG. 2 is a perspective view of a vehicle, such as an autonomous vehicle, incorporating the sensor and antenna assembly of FIG. 1, in accordance with examples of this disclosure.

FIG. 2 is an illustration of an example vehicle 200 including two instances of the sensor assembly 100, e.g., a first instance 100(1) and a second instance 100(2), in accordance with examples of the disclosure. The vehicle 200 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 200 may be configured to control all functions from start to completion of the trip, including all parking functions, it may not include a driver and/or controls for driving the vehicle 200, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 200 may be powered by one or more internal combustion engines, one or more electric motors, hydrogen power, any combination thereof, and/or any other suitable power source(s). The example vehicle 200 is illustrated as including four wheels 202 upon which the vehicle 200 travels. However, the systems and methods described herein may be incorporated into vehicles having fewer or a greater number of wheels, tires, and/or tracks. In the illustrated example, the vehicle 200 includes a body generally including a first end 204 and a second end 206 spaced from the first end 204 along a longitudinal axis 208 of the vehicle 200. The vehicle 200 body also includes opposite sides 210 and a roof 212. Although a certain body styling is illustrated, the example vehicle 200 may be any configuration of vehicle, such as, for example, a van, a sport utility vehicle, a cross-over vehicle, a truck, a bus, an agricultural vehicle, and a construction vehicle.

The example vehicle 200 may have four-wheel steering and may operate generally with equal performance characteristics in all directions. For example, the vehicle 200 may be a bi-directional vehicle configured to move such that either the first end 204 or the second end 206 may be a front end of the vehicle 200. With specific reference to FIG. 2, the first end 204 of the vehicle 200 is the front or leading end of the vehicle 100 and the second end 206 of the vehicle 200 is the rear or trailing end when the vehicle travels in a first direction 214. Similarly, the second end 206 of the vehicle 200 is the front or leading end of the vehicle 200 and the first end 204 of the vehicle 200 is the rear or trailing end when the vehicle 200 travels in a second direction 216 opposite the first direction 214. These example characteristics may facilitate greater maneuverability, for example, in small spaces or crowded environments, such as parking lots and urban areas, and may also facilitate continued operation of the vehicle under certain circumstances, e.g., in the event of failure of some functionality of the vehicle 200. Moreover, and in conjunction with the bi-directional functionality, the first end 204 and the second end 206 may be largely identical. For example, in some implementations including the illustrated example, the vehicle may be substantially longitudinally symmetrical, i.e., about a plane to which the longitudinal axis 208 is normal.

As noted above, the vehicle 200 includes a first instance of the sensor assembly 100(1) (hereinafter, the "first sensor assembly 100(1)") and a second instance of the sensor assembly 100(2) (hereinafter, the "second sensor assembly 100(2)"). The first sensor assembly 100(1) is arranged proximate the first end 204 of the vehicle 200 and the second sensor assembly 100(2) is arranged proximate the second end 206 of the vehicle 200. Both instances of the sensor assembly are generally aligned with the longitudinal axis 208 of the vehicle 200, although such is not required. As also illustrated, a sensor associated with the first sensor assembly 100(1) is configured to sense objects in a first field of view 218(1) proximate the first end 204 of the vehicle 200 and a sensor associated with the second sensor assembly 100(2) is configured to sense objects in a second field of view 218(2) proximate the second end 204 of the vehicle 200. For example, the first field of view 218(1) may be associated with a portion of the environment in front of the vehicle 200 when the vehicle 200 is travelling in the first direction 214, and the second field of view 218(2) may be associated with a portion of the environment in front of the vehicle 200 when the vehicle 200 is travelling in the second direction 216. The fields of view 218(1), 218(2) may also be associated with portions of the environment behind the vehicle 200, e.g., depending on the direction of travel.

As illustrated in FIG. 2, only a portion of the respective sensor assemblies 100(1), 100(2) extends above the roof 212. As shown, the vehicle 200 also includes a first fascia 220(1) secured to the roof 212 and a second fascia 220(2) secured to the roof 212. As detailed further below with reference to FIG. 3, the first fascia 220(1) and the second fascia 220(2) may be removably attached to the roof 212 to cover recesses configured to receive at least a portion of the sensor assemblies 100(1), 100(2). For instance, the recess 200 provides one or more mounting surfaces to which the sensor assemblies are secured, e.g., via the mounting holes 144. The first fascia 220(1) and the second fascia 220(2) may be complementary to the roof 212, e.g., to provide a relatively continuous overall surface on the top of the vehicle 200, e.g., including the roof 212 and the fasciae 220(1), 220(2).

Figure 3:
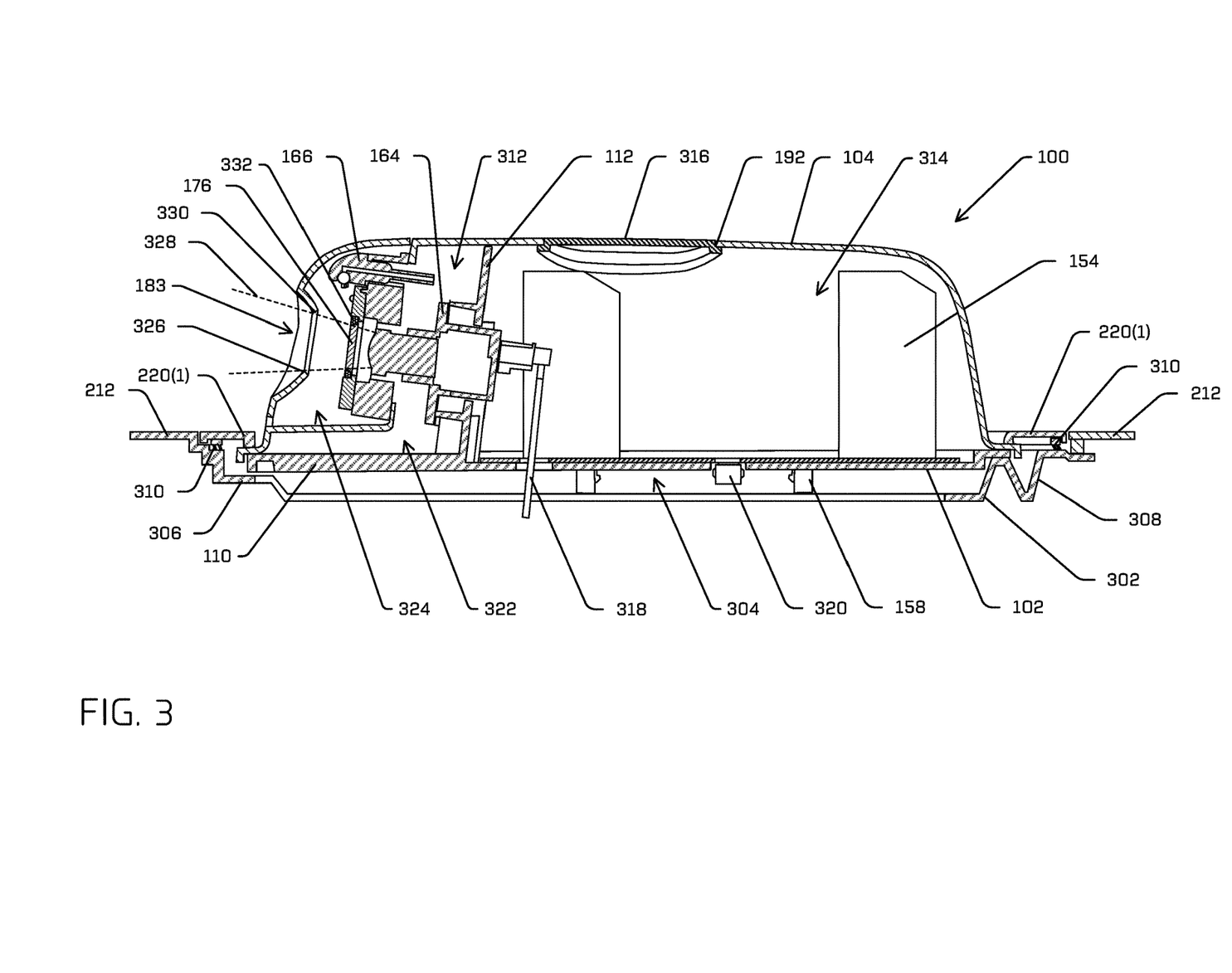
FIG. 3 is a cross-section view of the sensor and antenna assembly and a portion of the vehicle, taken along section line 3-3 in FIG. 2, in accordance with examples of this disclosure.

FIG. 3 is a cross-section of a portion of the vehicle 200, taken along section line 3-3 in FIG. 2. More specifically, FIG. 3 shows details of the interface between the vehicle 200 and the sensor assembly 100 as well as an interior volume of the sensor assembly 100 when the sensor assembly 100 is assembled and mounted on the vehicle 200.

The vehicle 200 includes a mounting frame 302 that is offset vertically relative to the roof 212. More specifically, in the example of FIG. 3, the mounting frame 302 creates a recess 304 below a roof line of the vehicle 200. The mounting frame 302 can include a number of rigid components including relatively horizontal portions 306 and angled members 308. Although obscured in FIG. 3, one of the horizontal members 306 may provide a mounting surface on which the frame 102 is mounted, e.g., via the mounting holes 144. Without limitation, threaded apertures may be positioned in the horizontal portions 306 of the mounting frame 302 at locations corresponding to locations of the mounting holes 144 and threaded inserts passed through the mounting holes 144 are threaded into the threaded apertures to couple the frame 102 to the vehicle 202, in the recess 304. The arrangement of the mounting frame 302 is for example only; other than the illustrated horizontal portions 306 and/or the angled members 208 may be used. Moreover, although the illustrated example includes the mounting frame 102 being disposed in the recess 304, in other examples the mounting frame 302 may not provide a vertical offset, so the recess 304 may not be included. In these examples, the frame 102 of the sensor assembly 100 may be fixed directly on the roof. Moreover, the use of threaded fasteners is for example only. Other mechanical fasteners, including but not limited to rivets, clips, bolts, pins, and/or the like may be used in other examples.

FIG. 3 also illustrates the fascia 210(1) disposed over peripheral portions of the cover 104. More specifically, the recess 304, as formed by the frame 302, provides sufficient vertical clearance that both the base 110 of the frame 102 and the peripheral edges of the cover 102 are disposed below the roof 212. Thus, only a portion of the cover 104 extends above the roof 212. In examples, the fascia 220(1) may be retained using mechanical fasteners, mating geometry, e.g., a protruding seal and channel arrangement, or the like. Moreover, the fascia 220(1) is illustrated as including a seal 310, which may prevent water, debris, or the like from entering the recess 304, e.g., via a gap between the roof 212 and the fascia 220(1). The seal 310 is illustrated as a wiper seal that contacts a portion of the mounting frame 302 of the roof 212. Other types of seals may be used in other examples. Moreover, it may be desirable that the fascia 220(1) is sealed to the cover 104. Although not illustrated in FIG. 3, a seal similar to the seal 310 may also be provided between the fascia 220(1) and the cover 104.

FIG. 3 also shows in detail that a volume inside the sensor assembly 100, e.g., defined by the frame 102 and the cover 104 is partitioned into a first cavity 312 and a second cavity 314. More specifically, the first cavity 312 is defined by a first portion of the cover 304, e.g., a first end of the cover 104, a portion of the base 110, e.g., proximate a first end of the base 110, and the wall 112. The second cavity 314 is defined by a second portion of the cover 304, e.g., a second end of the cover 104, a second portion of the base 110, e.g., proximate a second end of the base 110, and the wall 112. Stated differently, the wall 112 divides an inner volume of the sensor assembly 100 into the first cavity 312 and the second cavity 314. As shown, the sensor 164 and the lens assembly 166 are disposed in the first cavity 312 and the antennas (of which only the first antennas 154 are visible in FIG. 3) are disposed in the second cavity 314. FIG. 3 also does not include the light emitters, but such also are disposed in the second cavity 314 to emit light through the opening 192 in the top of the cover 104. A lens 316 is disposed in the opening 192 and may be configured to diffuse light emitted by the light emitters. The lens 316 may be a translucent plastic material configured to diffuse the light emitted by the light emitters such that the light is visible from above the vehicle. In some examples, the light emitters may be configured to emit differently-colored lights, light patterns, or the like, through the lens 316. As also illustrated in FIG. 3, the top of the wall 112 may be arranged proximate an inside surface of the cover 104. In some examples, the wall 112 may contact the cover to create an arrangement that effectively prevents light emitted by the light emitters from entering the first cavity 312, e.g., via a gap between the wall 112 and the cover 104. In this manner, stray light from the light emitters will not influence the sensor 164.

The wall 112 may also act as a shield between the sensor 164 disposed in the first cavity 312 and the antennas 154 In the illustrated example, the sensor 164 is mounted to the wall 112 and a portion of a housing of the sensor 164 passes through the wall 112, e.g., into the second cavity 314. In this example, a connector 318, which may provide power and/or data transfer to/from the sensor 326 is disposed in the second cavity 314, despite the sensor being disposed in the first cavity 312. In some examples, the connector 318 may be shielded relative to the antennas, e.g., to prevent electrical interference between the sensor 326 (or the connector 318) and the antennas 154, 156. In other examples, the sensor 164 and/or the connector 318 may be disposed entirely within the first cavity 312. The wall 112 may provide sufficient shielding to prevent electrical interference between the sensor 164 and the antennas 154, 156, although in other examples the wall 112 and/or the connector 318, may incorporate shielding to further reduce interference. The connector 318 is illustrated as passing through the base 110 of the frame 102 into the recess 304. Similarly, an LED connector 320, which may be a ribbon connector or other type of connector may also extend through the base 110. In this way, a power source (not shown) and/or computing devices (not shown) disposed in the vehicle 200 may be connected to components of the sensor assembly, including the antennas, the sensor, the light emitters, and/or the lens assembly 166. Moreover, and as described herein, the lens assembly 166 may also require a fluid source. The fluid source may be disposed in the vehicle, with a conduit, hose, or the like extending through the base 110 and into the vehicle, e.g., via the opening 182. In other examples, the conduit may extend through the wall 112, through the second cavity 314, and then through the base 110.

The sensor assembly 100, including the frame 102 and the cover 104 also align the sensor opening 183, the lens assembly 166, and the sensor 164, e.g., in the first cavity 312. More specifically, the sensor 164 is mounted on the mounting surface 138 and the lens assembly 166 is mounted on the exposed face 195 of the main body 199 of the cover 104. The cap 197 of the cover 104 may then be secured to the main body 199, as noted above. The structure of the main body 199 and the cap 197 results in the first cavity 312 including two sections, e.g., a first section 322 bounded by the main body 199, the base 110 and the wall 112 and a second section 324 bounded by the cap 197 and an outer surface of the main body 199. In this arrangement, the sensor 164 is disposed in the first section 322 and the lens assembly 166 is disposed in the second section 324. In this manner, the sensor 164 may be sealed in the first section 322, e.g., to reduce or eliminate debris, moisture, or the like, from impacting the sensor 164.

The sensor 164, the lens assembly 166, and the sensor opening 183 are aligned by the cover 104, e.g., including the main body 199 and the cap 197. More specifically, when the sensor 164 is a camera, such as a narrow-angle camera, the camera captures images corresponding to light that enters the sensor 164 through the sensor opening 183 and the lens 176. In the illustrated example, and as noted above, the sensor opening 183 may be configured to reduce unwanted or stray light from entering the sensor 166. The sensor opening 183 includes an edge 326, which may be continuous (e.g., about the entire sensor opening 183) may have a size and shape that approximates the size and shape of a field of view 328 of the sensor 164. As also illustrated, the sensor opening 183 can include an undercut 330 at the edge 326. According to this arrangement, light that may enter through the sensor opening 183 at an angle outside the field of view will not be reflected into the field of view or otherwise impinge upon the sensor 164. Stated differently, the edge 326 acts as a vane or other type of optical stop that helps to prevent stray light from entering the sensor 164. The lens assembly 166 may integrate a similar vane-type structure that also helps to reduce stray light into the sensor 164. The lens 176 of FIG. 3 includes a mask 332 that also approximates the size and shape of the field of view 328 of the sensor 164. In examples, the wall 112 (to which the sensor 164 is mounted), the main body 199 of the cover 104 (to which the lens assembly 166 is mounted), and the cap 197 of the cover 104 (which includes the sensor opening 183) are aligned relative to each other, e.g., using datum surfaces, cooperating fasteners, or the like. More specifically, the cap 197 may be secured to the main body 199 within a specific tolerance to ensure alignment of the various components.

Figure 4:
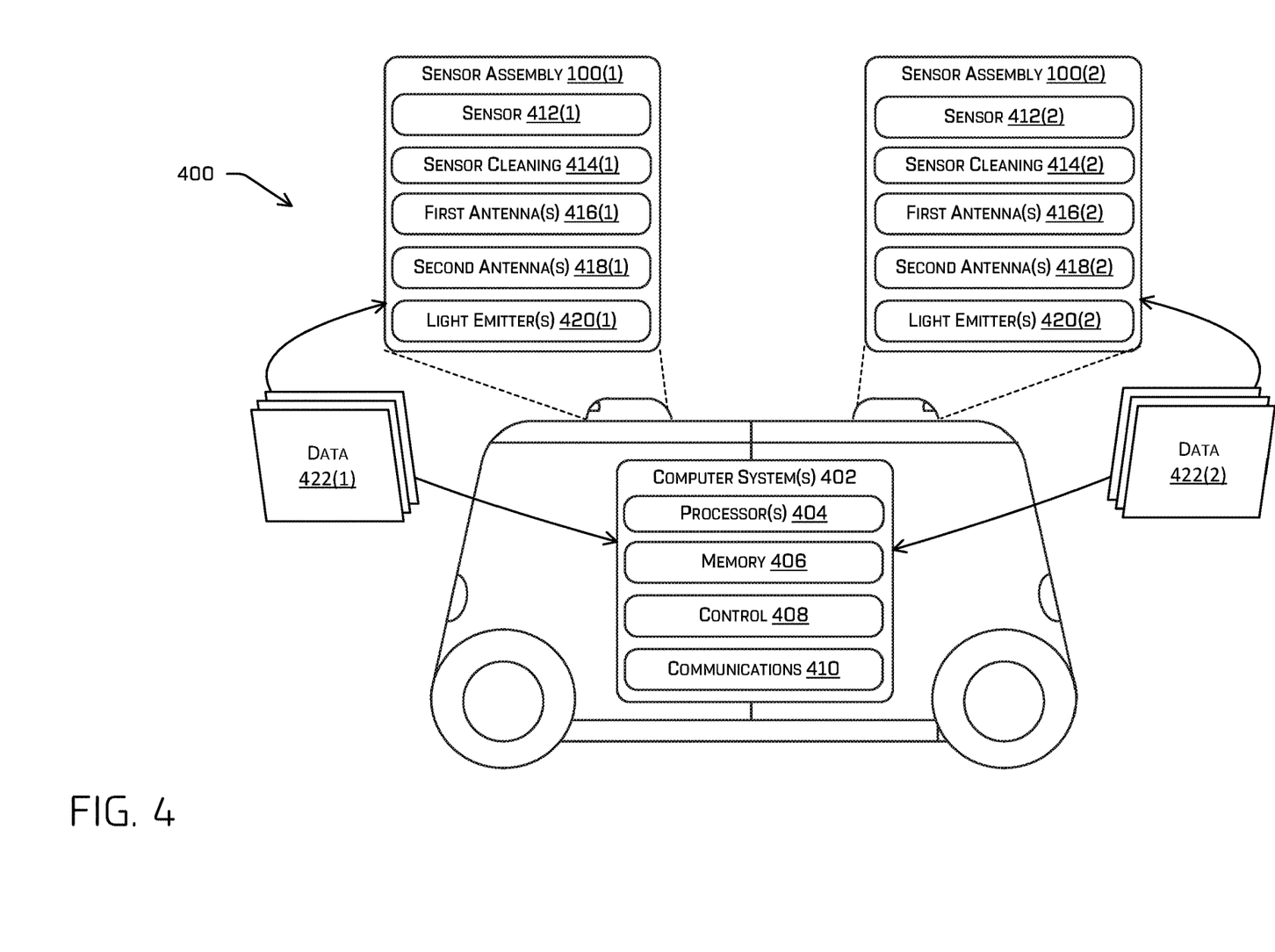
FIG. 4 is a block diagram of an example vehicle system incorporating aspects of the sensor and antenna assembly, in accordance with examples of this disclosure.

FIG. 4 is a block diagram of a vehicle 400, which may be the vehicle 200. The vehicle 400 includes a first instance of the sensor assembly 100, that is, a first sensor assembly 100(1), and a second instance of the sensor assembly 100, that is, a second sensor assembly 100(2). The vehicle 400 includes one or more computer systems 402 to control operation of one or more systems of the vehicle 400.

The computer system(s) 402 include one or more processors 404 and memory 406 communicatively coupled to the one or more processor(s) 406. The processor(s) 406 may be configured to execute instructions stored in the memory 404, e.g., to control the vehicle 400 to receive and process sensor data from one or more sensors, to plan a route for the vehicle 400 through the environment, or the like. In some examples, the computer system(s) 402 may also include a control component 408 configured to control subsystems of the vehicle 400. For example, the control component 408 may control various of the components within the sensor assemblies 100(1), 100(2).

The processor(s) 404 of the vehicle 400 may be any suitable processor capable of executing instructions to process data and perform operations as described herein. By way of example and not limitation, the processor(s) 404 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 406 is an example of non-transitory computer-readable media. The memory 406 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 406 may include at least a working memory and a storage memory. For example, the working memory may be a high-speed memory of limited capacity (e.g., cache memory) that is used for storing data to be operated on by the processor(s) 404. In some instances, the memory 406 may include a storage memory that may be a lower-speed memory of relatively large capacity that is used for long-term storage of data. In some cases, the processor(s) 404 cannot operate directly on data that is stored in the storage memory, and data may need to be loaded into a working memory for performing operations based on the data, as discussed herein.

The computer system(s) 402 may also include one or more communications components 410. For instance, the communications component(s) 410 can enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the computer system(s) 402 to interface with other computing device(s). The communication component(s) 410 may further include physical and/or logical interfaces for connecting the vehicle computer system(s) 402 to another computing device or a network.

FIG. 4 also illustrates that the first sensor assembly 100(1) includes a first sensor 412(1), a first sensor cleaning system 414(1), one or more first antennas 416(1), one or more second antennas 418(1), and one or more light emitter(s). Similarly, the second sensor assembly 100(2) includes a second sensor 412(2), a second sensor cleaning system 414(2), one or more first antennas 416(2), one or more second antennas 418(2) and one or more second light emitters 420(2). Herein, the first sensor 412(1) and the second sensor 412(2) may be referred to collectively as "the sensors 412." Similarly, the first sensor cleaning system 414(1) and the second sensor cleaning system 414(2) may be referred to collectively as "the sensor cleaning systems 414," the first antenna(s) 416(1) and the first antenna(s) 416(2) may be referred to collectively as "the first antennas 416," the second antenna(s) 418(1) and the second antenna(s) 418(2) may be referred to collectively as "the second antennas 418," and the first light emitter(s) 420(1) and the second light emitter(s) 420(2) may be referred to collectively as "the light emitters 420."

The sensors 412 may be the sensor 164 and/or the sensor device 106. Without limitation, the sensors 412 can include time-of-flight sensors, LIDAR sensors, RADAR sensors, SONAR sensors, infrared sensors, cameras (e.g., RGB, IR, intensity, depth, etc.), or the like. Although FIGS. 1 and 3 show only a single instance of the sensor 164, in some instances multiple sensors 412, e.g., of the same or different modalities, may be disposed in the first cavity 312. In some examples, to accommodate additional sensors, the cover may include a number of the sensor opening 183 corresponding to the number of the sensors 412. The sensors 412 can generate sensor data and provide such data to the vehicle computer system(s) 402.

The sensor cleaning systems 414 may include aspects of the lens assembly 166 illustrated in FIGS. 1 and 3. For example, and without limitation, the sensor cleaning systems 414 can include a lens covering the sensor and through which light passes to the sensor. The sensor cleaning systems 414 can include features for cleaning the lens, including but not limited to fluid dispersion systems, heating systems, vibration systems, wiping systems, or the like.

The first antennas 416 and the second antennas 418 may be the first antennas 154 and the second antennas 156 in some examples. The first antennas 416 and/or the second antennas can include Wi-Fi antennas, cellular antennas, blue-tooth antennas, near-range radio frequency antennas, or any other types of antennas for receiving over-the-air signals.

The light emitters 420 can be the light emitters 160. The light emitters 420 can be light emitting diodes or other light emitters. In examples, the light emitters 420 can include a number of differently colored light emitters and/or light emitters capable of being configured to emit differently-colored lights. By way of example and not limitation, the light emitters 420 may include lights to signal a direction of travel or other indicator of vehicle action.

The sensor assemblies 100(1), 100(2) are in communication with computer system(s) 402. In some examples, the sensor assemblies 100(1), 100(2) may be wired to the computer system(s) 402 as detailed herein. For example, the first antennas 416 and/or the second antennas 418 may be in communication with one or more of the communications component(s) 410. In one non-limiting example, the first antennas 416 and/or the second antennas 418 may be cellular antennas in wired communication with a cellular radio of the communication component(s) 410. The flow of information from the sensor assemblies 100(1), 100(2) is generally shown as first data 422(1) and second data 422(2) (collectively, "the data 422"). The data 422 generally includes any information passing between the sensor assemblies 100(1), 100(2) and the computer system(s) 402. Without limitation, the data 422 can include sensor data generated by the sensors 414 and/or information received at the first antennas 416 and/or the second antennas 418. In other examples, the data 422(1) can include instructions from the computer system(s) to cause the sensors 412, the sensor cleaning systems 414 and/or the light emitters 420 to perform some operation. Although not illustrated in FIG. 4, in some implementations data can be exchanged between the first sensor assembly 100(1) to the second sensor assembly 100(2).

Figure 5:
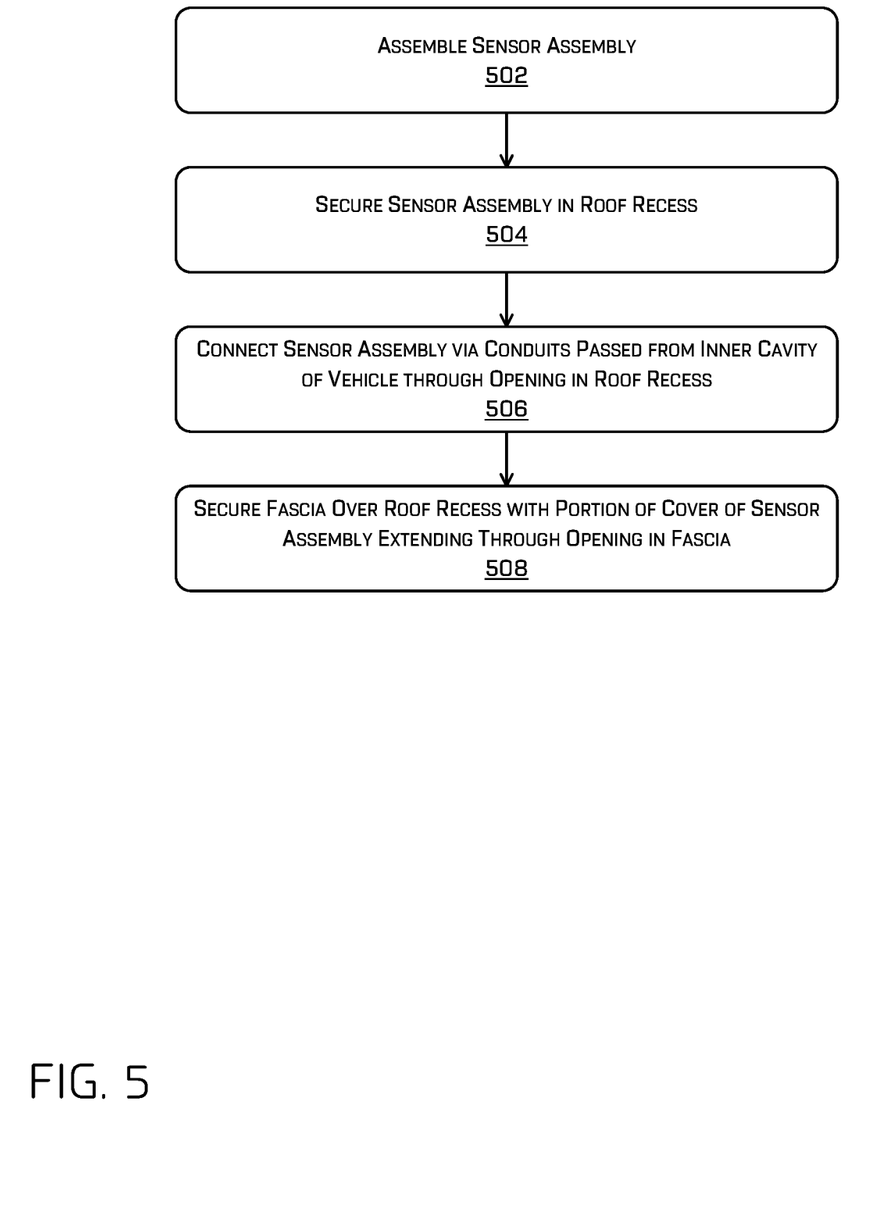
FIG. 5 is a flow chart showing an example process for assembling a vehicle including a sensor and antenna assembly, in accordance with examples of this disclosure.

FIG. 5 depicts an example process 500 of assembling a vehicle with a sensor assembly. At operation 502, the process 500 includes assembling a sensor assembly. For example, assembling the sensor assembly can include providing the frame 102, the cover 104, the sensor assembly 106, and the antenna assembly 108. The antenna assembly 108 may be secured to the first mounting surface 122 and the sensor 164 may be secured to the second mounting surface 138. With the antenna assembly 108 and the sensor 164 secured in this manner, the main body 199 of the cover 104 may then be secured to the frame 102, e.g., using the mounting holes 194 and cooperating mounting holes 196. The lens assembly 166 may then be secured to the exposed face 195 of the main body 199 of the cover 102, and the cap 197 of the cover 102 may be secured to the main body 199.

At operation 504, the process 500 includes securing the sensor assembly in a roof recess. For example, and as illustrated in FIG. 3, the vehicle 200 can include, proximate the roof 212, a recess 304 in which the assembled sensor assembly is mounted. In examples, the recess 304 can include threaded apertures for receiving threaded fasteners passing through the mounting holes 196 of the frame 102. The mounting holes 196 extend laterally from the cover 102 in example of FIG. 1.

At operation 506, the process 500 includes connecting the sensor assembly via conduits passed from an inner cavity of the vehicle through an opening in the roof recess. For example, and as illustrated in FIGS. 1 and 3, several openings may be formed in the base 110 of the frame 102 through which electrical connections, data connections, fluid connections, and/or the like can be passed from inside the sensor assembly 100. With the sensor assembly 100 mounted on the vehicle 200, the connections may pass out of the sensor assembly 100 and into the vehicle 200. In the vehicle 200, the connections may be connected to power sources, computing systems, fluid reservoirs, and/or the like, as detailed further herein.

At operation 508, the process 500 includes securing a fascia over the roof recess with a portion of the cover of the sensor assembly extending through an opening in the fascia. As illustrated in FIGS. 2 and 3, a fascia 220 is secured over the periphery of the cover 102. A surface of the fascia 220 may be substantially coplanar with the roof, e.g., to maintain a consistent roof line. In the example arrangement, only a portion of the cover 102 extends above the roof line; no other portions of the sensor assembly 100 are visible. The fascia 220 may also create a seal with the vehicle 200, e.g., to prevent water and/or other debris from entering the recess in which the sensor assembly is coupled.

EXAMPLE CLAUSES

Any of the example clauses in this section may be used with any other of the example clauses and/or any of the other examples or embodiments described herein.

A: An example sensor assembly includes a frame comprising: a mounting interface to removably couple the sensor assembly to a roof of a vehicle, a base extending between a first frame end and a second frame end and providing a first mounting surface, and a wall disposed between the first frame end and the second frame end and extending from the base, the wall providing a second mounting surface; a cover extending from a first cover end to a second cover end, the cover being coupled to the frame to define a volume between the cover and the base and the wall being disposed to divide the volume into a first cavity between the first cover end and the wall and a second cavity between the second cover end and the wall, the cover comprising an opening in the first cover end; a camera disposed in the first cavity and secured to the second mounting surface to image objects in an environment of the vehicle through the opening in the first cover end; and a plurality of antennas coupled to the first mounting surface and disposed in the second cavity, the plurality of antennas facilitating communication at the vehicle.

B: The sensor assembly of example A, further comprising a light emitter disposed in the second cavity and coupled to the first mounting surface, the light emitter being configured to emit light through a second opening in a top of the cover, wherein the cover is sealed relative to the wall to prevent light emitted by the light emitter from entering the first cavity.

C: The sensor assembly of example A and example B, wherein: the opening comprises a continuous edge defining a shape of the opening; the shape corresponds to a field of view of the camera; and the continuous edge includes an angle to reduce reflection of light rays outside the field of view of the camera from being detected at the camera.

D: The sensor assembly of any of example A through example C, wherein the cover comprises a main body and a cap removably coupled to the main body and including the opening.

E: The sensor assembly of any of example A through example D, wherein: the camera comprises a narrow-angle camera; and the plurality of antennas comprise at least one Wi-Fi antenna and at least one cellular antenna.

F: An example vehicle includes: a roof; and a sensor assembly disposed on the roof, the sensor assembly comprising: a frame including a base configured for securement to the roof and a wall extending from the base in a direction above the roof; a cover coupled to the frame, wherein a first portion of the cover, a first portion of the base, and a first side of the wall define a first cavity and a second portion of the cover, a second portion of the base, and a second side of the wall define a second cavity, the first portion of the cover including an opening; a sensor disposed in the first cavity and configured to sense data of an environment of the vehicle through the opening; and one or more antennas disposed in the second cavity.

G: The vehicle of example F, wherein the roof comprises: a recess receiving at least a portion of the base of the frame; and a fascia secured to the roof to cover the recess, the fascia comprising a sensor assembly opening through which at least a portion of the cover extends above the roof.

H: The vehicle of example F or example G, further comprising one or more openings disposed in the recess, the vehicle further comprising: one or more cables extending from inside the vehicle through the one or more openings, the one or more cables supplying power to at least one of the sensor or one or more of the plurality of antennas.

I: The vehicle of any of example F through example H, wherein the second portion of the cover comprises a second opening through a top surface of the cover, the sensor assembly further comprising: a light emitter disposed in the second cavity and configured to emit light through the second opening.

J: The vehicle of any of example F through example I, wherein the first cavity is sealed relative to the second cavity to prevent the light emitted by the light emitter from entering the first cavity.

K: The vehicle of any of example F through example J, further comprising a lens disposed in the second opening through which the light emitted by the light emitter is diffused.

L: The vehicle of any of example F through example K, wherein: the first portion of the cover comprises a continuous edge defining a shape of the opening; the shape corresponds to a field of view of the sensor; and the continuous edge is angled to reduce reflection of light rays outside the field of view of the sensor from reaching the sensor.

M: The vehicle of any of example F through example L, wherein the first portion of the cover is removably secured to the second portion, at least one of the first portion of the cover or the second portion of the cover comprising one or more datum surfaces for aligning the opening relative to the second portion.

N: The vehicle of any of example F through example M, the sensor assembly further comprising: a sensor cleaning system disposed in the first cavity and associated with sensor, the sensor cleaning system comprising at least one of a nozzle configured to spray fluid on a lens associated with the sensor, a vibrating mechanism configured to vibrate the lens, or a heating element configured to heat the lens.

O: A vehicle comprising: a body at least partially defining an interior and including a roof; a first sensor assembly coupled to the roof proximate a first end of the body, the first sensor assembly comprising: a first frame including a first base secured to the roof and a first wall extending from the first base above the roof, a first cover coupled to the first frame, wherein the first cover, the first frame and the first wall define a first sensor cavity and a first antenna cavity, the first sensor cavity and the first antenna cavity separated by the first wall, a first sensor associated with a first field of view disposed in the first sensor cavity, and a first antenna disposed in the first antenna cavity; and a second sensor assembly coupled to the roof proximate a second end of the body, the second sensor assembly comprising: a second frame including a second base secured to the roof and a second wall extending from the second base above the roof, a second cover coupled to the second frame, wherein the second cover, the second frame and the second wall define a second camera cavity and a second antenna cavity, the second camera cavity and the second antenna cavity separated by the second wall, a second camera disposed in the second camera cavity, and a plurality of second antennas disposed in the second antenna cavity, wherein the first sensor is positioned to capture first sensor data of a first region of an environment proximate the vehicle and the second sensor is positioned to capture second image data of the environment in a second field of view proximate the second end of the body of the vehicle.

P: The vehicle of example O, further comprising: a cellular radio disposed in the vehicle, wherein the cellular radio is connected to a first antenna of the plurality of first antennas and to a second antenna of the second plurality of antennas.

Q: The vehicle of example O or example P, wherein: the first cover comprises a first opening having a first shape corresponding to a first periphery of the first field of view; and the second cover comprises a second opening having a second shape corresponding to a second periphery of the second field of view.

R: The vehicle of any of example O through example Q, wherein the body further comprises: a first recess in the roof proximate the first end of the body, the first recess receiving at least a portion of the first base of the first frame; a second recess in the roof proximate the second end of the body, the second recess receiving at least a portion of the second base of the second frame; a first fascia secured to the roof to cover the first recess and comprising a first sensor assembly opening through which at least a portion of the first cover extends above the roof; and a second fascia secured to the roof to cover the second recess and comprising a second sensor assembly opening through which at least a portion of the second cover extends above the roof.

S: The vehicle of any of example O through example R, further comprising at least one of: one or more cleaning components disposed in the first sensor cavity to clean a first lens associated with the first sensor; or one or more second cleaning components disposed in the second sensor cavity to clean a second lens associated with the second sensor.

T: The vehicle of any one of example O through example S, wherein the one or more first cleaning components or the one or more second cleaning components comprise at least one of a fluid, compressed air, or a vibrating mechanism.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A sensor assembly comprising:
a frame comprising:
   a base extending between a first frame end and a second frame end and providing a first mounting surface,
   a wall disposed between the first frame end and the second frame end and extending from the base, the wall providing a second mounting surface extending in a non-perpendicular direction relative to the base; and
   a mounting interface to removably couple the sensor assembly to a roof of a vehicle, the roof of the vehicle including:
      a recess proximate an end of the roof, the recess receiving at least a portion of the base of the frame; and
      a fascia removably secured to the roof to cover the recess and comprising a sensor assembly opening through which at least a portion of a cover extends above the roof;
the cover extending from a first cover end to a second cover end of the base, the cover being coupled to the frame to define a volume between the cover and the base and the wall being disposed to divide the volume into a first cavity between the first cover end and the wall and a second cavity between the second cover end and the wall, the cover comprising an opening in the first cover end;
a camera disposed in the first cavity and secured to the second mounting surface, and aligned such that the camera is tilted upward relative to the base at the first cover end to image objects in an environment of the vehicle through the opening in the first cover end; and
a plurality of antennas coupled to the first mounting surface and disposed in the second cavity, the plurality of antennas facilitating communication at the vehicle.

2. The sensor assembly of claim 1, further comprising:
a light emitter disposed in the second cavity and coupled to the first mounting surface, the light emitter being configured to emit light through a second opening in a top of the cover,
wherein the cover is sealed relative to the wall to prevent light emitted by the light emitter from entering the first cavity.

3. The sensor assembly of claim 1, wherein:
the opening comprises a continuous edge defining a shape of the opening;
the shape corresponds to a field of view of the camera; and
the continuous edge includes an angle to reduce reflection of light rays outside the field of view of the camera from being detected at the camera.

4. The sensor assembly of claim 1, wherein the cover comprises a main body and a cap removably coupled to the main body and including the opening.

5. The sensor assembly of claim 1, wherein:
the camera comprises a narrow-angle camera; and
the plurality of antennas comprise at least one Wi-Fi antenna and at least one cellular antenna.

6. A vehicle comprising:
a body at least partially defining an interior and including a roof, the body further comprising:
   a recess in the roof proximate an end of the body, the recess receiving at least a portion of a base of a frame; and
   a fascia removably secured to the roof to cover the recess and comprising a sensor assembly opening through which at least a portion of a cover extends above the roof;
a sensor assembly disposed on the roof, the sensor assembly comprising:
   the frame including a base configured for securement to the roof and a wall extending in a non-perpendicular direction from the base;
   the cover coupled to the frame, wherein a first portion of the cover, a first portion of the base, and a first side of the wall define a first cavity and a second portion of the cover, a second portion of the base, and a second side of the wall define a second cavity, the first portion of the cover including an opening;
   a sensor disposed in the first cavity and coupled to the wall, the wall aligning the sensor such that the sensor is tilted upward relative to a longitudinal axis of the vehicle and configured to sense data of an environment of the vehicle through the opening; and
   one or more antennas disposed in the second cavity.

7. The vehicle of claim 6, further comprising one or more openings disposed in the recess, the vehicle further comprising: one or more cables extending from inside the vehicle through the one or more openings, the one or more cables supplying power to at least one of the sensor or the one or more antennas.

8. The vehicle of claim 6, wherein the second portion of the cover comprises a second opening through a top surface of the cover, the sensor assembly further comprising:
   a light emitter disposed in the second cavity and configured to emit light through the second opening.

9. The vehicle of claim 8, wherein the first cavity is sealed relative to the second cavity to prevent the light emitted by the light emitter from entering the first cavity.

10. The vehicle of claim 8, further comprising a lens disposed in the second opening through which the light emitted by the light emitter is diffused.

11. The vehicle of claim 6, wherein:
   the first portion of the cover comprises a continuous edge defining a shape of the opening;
   the shape corresponds to a field of view of the sensor; and
   the continuous edge is angled to reduce reflection of light rays outside the field of view of the sensor from reaching the sensor.

12. The vehicle of claim 11, wherein the first portion of the cover is removably secured to the second portion, at least one of the first portion of the cover or the second portion of the cover comprising one or more datum surfaces for aligning the opening relative to the second portion.

13. The vehicle of claim 6, the sensor assembly further comprising:
   a sensor cleaning system disposed in the first cavity and associated with the sensor, the sensor cleaning system comprising a nozzle configured to spray fluid on a lens associated with the sensor.

14. A vehicle comprising:
a body at least partially defining an interior and including a roof, the body further comprising:
   a first recess in the roof proximate a first end of the body, the first recess receiving at least a portion of a first base of a first frame;
   a second recess in the roof proximate a second end of the body, the second recess receiving at least a portion of a second base of a second frame;
   a first fascia removably secured to the roof to cover the first recess and comprising a first sensor assembly opening through which at least a portion of a first cover extends above the roof; and
   a second fascia removably secured to the roof to cover the second recess and comprising a second sensor assembly opening through which at least a portion of a second cover extends above the roof;
a first sensor assembly coupled to the roof proximate a first end of the body, the first sensor assembly comprising:
   the first frame including the first base secured to the roof and a first wall extending in a first non-perpendicular direction from the first base above the roof,
   the first cover coupled to the first frame, wherein the first cover, the first frame and the first wall define a first sensor cavity and a first antenna cavity, the first sensor cavity and the first antenna cavity separated by the first wall,
   a first sensor coupled to the first wall and associated with a first field of view disposed in the first sensor cavity, the first wall aligning the first sensor such that the first sensor is tilted upward relative to a longitudinal axis of the vehicle, and
   a plurality of first antennas disposed in the first antenna cavity; and
a second sensor assembly coupled to the roof proximate a second end of the body, the second sensor assembly comprising:
   a second frame including a second base secured to the roof and a second wall extending in a second non-perpendicular direction from the second base above the roof,
   a second cover coupled to the second frame, wherein the second cover, the second frame and the second wall define a second sensor cavity and a second antenna cavity, the second sensor cavity and the second antenna cavity separated by the second wall,
   a second sensor coupled to the second wall and disposed in the second sensor cavity, the second wall aligning the second sensor such that the second sensor is tilted upward relative to the longitudinal axis of the vehicle, and
   a plurality of second antennas disposed in the second antenna cavity,
wherein the first sensor is positioned to capture first sensor data of a first region of an environment proximate the vehicle and the second sensor is positioned to capture second image data of the environment in a second field of view proximate the second end of the body of the vehicle.

15. The vehicle of claim 14, further comprising:
a cellular radio disposed in the vehicle, wherein the cellular radio is connected to a first antenna of the plurality of first antennas and to a second antenna of the second plurality of antennas.

16. The vehicle of claim 14, wherein:
the first cover comprises a first opening having a first shape corresponding to a first periphery of the first field of view; and the second cover comprises a second opening having a second shape corresponding to a second periphery of the second field of view.

17. The vehicle of claim 14, further comprising at least one of:
    one or more first cleaning components disposed in the first sensor cavity to clean a first lens associated with the first sensor; or
    one or more second cleaning components disposed in the second sensor cavity to clean a second lens associated with the second sensor.

18. The vehicle of claim 17, wherein the one or more first cleaning components or the one or more second cleaning components comprise at least one of a fluid, compressed air, or a vibrating mechanism.

19. The sensor assembly of claim 1, wherein the wall is angled between about 45 degrees to about 135 degrees relative to the base.

\* \* \* \* \*